Jan. 29, 1929.
E. ALTENKIRCH
1,700,276
ABSORPTION MACHINE
Filed Oct. 17, 1927
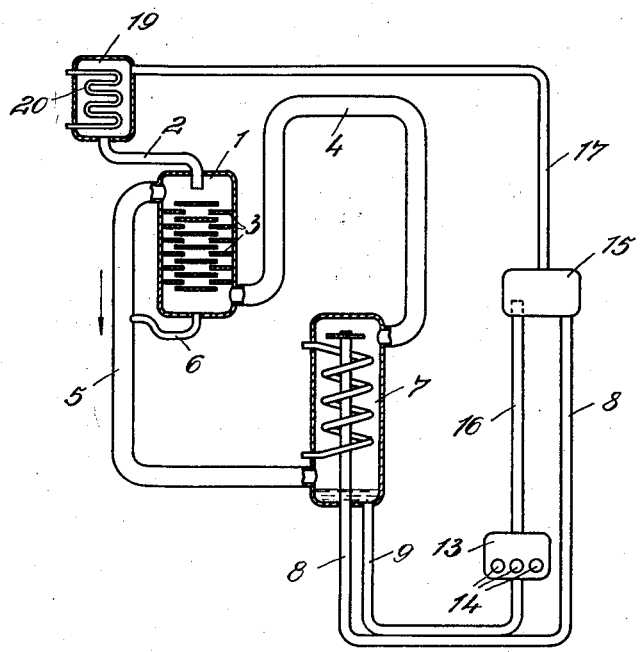
Inventor
Edmund Altenkirch
by Knight Bro
Attorneys Patented Jan. 29, 1929.

1,700,276

UNITED STATES PATENT OFFICE.

EDMUND ALTENKIRCH, OF ALT-LANDSBERG-SUD, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY.

ABSORPTION MACHINE.

Application filed October 17, 1927, Serial No. 226,768, and in Germany July 29, 1926.

My invention refers to absorption machines, more especially of the kind which is used for refrigeration, in which an absorbable gas is in contact with a liquid to be alternately absorbed by and expelled from such liquid, heat being either liberated or absorbed in consequence of this interaction. The invention more particularly refers to a machine lacking all movable parts and having admixed to the absorbable gaseous refrigerant in the absorber and evaporator a non-absorbable gas. If in a machine of this kind the evaporator is disposed at a higher level than the absorber, the mixture of gases will circulate inasmuch as the gas mixture on being cooled down in the evaporator has a higher specific gravity. By admixing an inert (non-absorbable) gas, having a lower molecular weight than that of the refrigerant, this effect can be increased further. Inasmuch as the mixture in the evaporator increases in weight, either by the addition of the weightier refrigerant or by cooling, it will descend in the evaporator, flowing through it in downward direction. Now in many cases the reverse flow of the gas mixture in the evaporator in upward direction would be preferable, for the liquid refrigerant enters at the top of the evaporator and drips down therein. When entering at the top its temperature is the highest, while at the bottom it is lowest. In order, however, to be able to evaporate the liquid refrigerant also at the lowest temperature, it should be brought in contact with that mixture of gases in which the gaseous refrigerant still has the lowest partial pressure, while the liquid refrigerant entering at the top with a high temperature will evaporate also if the partial pressure of the refrigerant in the mixture of gases, owing to this mixture having become concentrated, has already risen. Therefore in order to obtain the most favourable mode of operation from the thermo-dynamical point of view, the gas mixture should flow from below upwardly.

In the absorption machine according to the present invention this mode of operation can be carried out, the machine being characterized thereby that the highest point of the conduit, through which the gas mixture flows from the absorber to the evaporator, is arranged at a higher level than the gas exhaust port of the evaporator.

In the drawing affixed to this specification and forming part thereof a machine embodying my invention is illustrated diagrammatically by way of example.

Referring to the drawing, 1 is the evaporator, in which refrigeration is produced by the evaporation of the liquid refrigerant, such as ammonia, supplied through pipe 2. The refrigerant drips down over the baffle plates 3 and thus passes through the evaporator from above in downward direction, while the mixture of gases, such as ammonia gas and air, enters the evaporator from below through the tube 4 and travels upwardly. In so doing it takes up the evaporating ammonia and flows through tube 5 to the absorber 7. In the absorber dilute absorption liquid drips down, which is supplied through tube 8 and after collecting at the bottom of the absorber escapes through pipe 9. The liquid absorbs a considerable part of the ammonia contained in the gas mixture so that this latter, when escaping from the absorber through tube 4, only contains small quantities of ammonia. The concentrated solution flows from the absorber through tube 9 to the boiler 13 which is here shown to be heated by heating resistances 80 which may, however, also be replaced by any other suitable source of heat. The supply of heat causes the ammonia gas to be expelled again. This gas now flows upwardly through pipe 16 and carries the solution of ammonia along with it into the gas separator 15. From the separator the poor or dilute absorption liquid returns through pipe 8 into the absorber 7, while the expelled ammonia gas is conducted through pipe 17 into the condenser 19 to be there condensed, the heat of evaporation being abducted by the cooling coil 20. The condensate flows through pipe 2 back into the evaporator 1.

As shown in the drawing, the highest point of tube 4 is disposed at a higher level than the point where the gas mixture from the evaporator 1 enters the tube 5. That this arrangement has the desired result, is shown, if the mode of operation after the machine has started working, is examined. Before the start the evaporator 1 and absorber 7 have been filled with a gas mixture which contains a uniform percentage of ammonia gas. In order to start the machine, the boiler or expeller 13 is heated by means of the resistances 14 and the ammonia gas now expelled flows through pipe 17 into the condenser 19 to be there condensed and to flow into the evaporator 1 in the form of a liquid. The gas mixture having gained in weight by cooling and by the admixture of the gaseous ammonia has the tendency of flowing downwardly and therefore fills the adjoining bottom part of tube 4, being, however, prevented from rising in this tube to a higher level than in the evaporator 1. The gas mixture in the evaporator is thus gradually enriched with ammonia, until the cooled and enriched gas mixture enters the tube 5, wherein it descends owing to its higher specific gravity and flows towards the absorber. In this manner the circulation of the gas mixture in the desired sense is started. The mixture of gases displaced from the absorber 7 and containing less ammonia flows through tube 4 into the bottom of the evaporator 1 and the cycle is now closed.

As it is unavoidable that in the bottom part of the evaporator more or less liquid collects, which has escaped evaporation, without being able to escape through the gas tubes 4 and and 5, a separate tap pipe 6 is provided, which is so formed that a liquid seal can form therein, thereby preventing gas from passing through. Preferably this pipe is not directly connected with the absorber, but with the gas tube 5. As the liquid escaping through pipe 5 is always rich in ammonia, part of this ammonia will evaporate into the gas mixture flowing past the pipe 6, and this will have a favorable action on the starting of the desired gas circulation, when the machine is being started.

The present invention is particularly useful also in the case where the evaporator 1 is not supplied with liquid ammonia but with an absorption liquid enriched with ammonia and from which the ammonia shall evaporate. In this latter case the gas mixture flowing upwardly in the evaporator has a particularly great influence on the thermo-dynamical action.

I wish it to be understood that I do not desire to be limited to the exact details of construction shown and described for obvious modifications will accur to a person skilled in the art.

I claim:—

1. Absorption machine comprising an evaporator, an absorber, a gas exhaust port in said evaporator, a mixture of an absorbable gas and a non-absorbable gas of different specific gravities arranged for circulation between said evaporator and said absorber, a conduit for said mixture leading from the upper part of said absorber to the lower part of said evaporator, the highest point of said conduit being disposed at a higher level than the gas exhaust port of said evaporator and a second conduit leading from said gas exhaust port to said absorber.

2. Absorption machine comprising an evaporator, an absorber, a gas exhaust port in said evaporator, a mixture of an absorbable gas and a non-absorbable gas of different specific gravities arranged for circulation between said evaporator and said absorber, a conduit for said mixture leading from the upper part of said absorber to the lower part of said evaporator, the highest point of said conduit being disposed at a higher level than the gas exhaust port of said evaporator, a second conduit leading from said gas exhaust port to said absorber and a liquid exhaust pipe leading from said evaporator to said absorber.

3. Absorption machine comprising an evaporator, an absorber, a gas exhaust port in said evaporator, a mixture of an absorbable gas and a non-absorbable gas of different specific gravities arranged for circulation between said evaporator and said absorber, a conduit for said mixture leading from the upper part of said absorber to the lower part of said evaporator, the highest point of said conduit being disposed at a higher level than the gas exhaust port of said evaporator, a second conduit leading from said gas exhaust port of said absorber, a liquid exhaust pipe leading from said evaporator to said absorber and a liquid seal in said pipe.

4. Absorption machine comprising an evaporator, an absorber, a gas exhaust port in said evaporator, a mixture of an absorbable gas and a non-absorbable gas of different specific gravities arranged for circulation between said evaporator and said absorber, a conduit for said mixture leading from the upper part of said absorbed to the lower part of said evaporator, the highest point of said conduit being disposed at a higher level than the gas exhaust port of said evaporator, a second conduit leading from said gas exhaust port to said absorber and a liquid exhaust pipe of U-shape leading from said evaporator to said absorber.

5. Absorption machine comprising an evaporator, an absorber, a gas exhaust port in said evaporator, a mixture of an absorbable gas and a non-absorbable gas of different specific gravities arranged for circulation between said evaporator and said absorber, a conduit for said mixture leading from the upper part of said absorber to the lower part of said evaporator, the highest point of said conduit being disposed at a higher level than the gas exhaust port of said evaporator, a second conduit leading from said exhaust port to said absorber and a liquid exhaust pipe leading from the lower part of said evaporator into said second conduit.

In testimony whereof I affix my signature.

EDMUND ALTENKIRCH.